(12) United States Patent
Mikalsen et al.

(10) Patent No.: US 10,822,068 B2
(45) Date of Patent: Nov. 3, 2020

(54) SYSTEM AND METHOD FOR MINIMIZING FUEL USAGE AND EMISSIONS OF A MARINE VESSEL

(71) Applicant: Marine Technologies LLC, Mandeville, LA (US)

(72) Inventors: Jan Mikalsen, Covington, LA (US); Richard Allinson, North Berwick (SC)

(73) Assignee: MARINE TECHNOLOGIES, LLC, Mandeville, LA (US)

( * ) Notice: Subject to any disclaimer, the term of this patent is extended or adjusted under 35 U.S.C. 154(b) by 0 days.

(21) Appl. No.: 16/530,706

(22) Filed: Aug. 2, 2019

(65) Prior Publication Data

US 2020/0039623 A1 Feb. 6, 2020

Related U.S. Application Data

(60) Provisional application No. 62/713,917, filed on Aug. 2, 2018.

(51) Int. Cl.
*B63H 21/21* (2006.01)
*B63H 21/20* (2006.01)

(52) U.S. Cl.
CPC ............ *B63H 21/21* (2013.01); *B63H 21/20* (2013.01); *B63H 2021/205* (2013.01); *B63H 2021/216* (2013.01)

(58) Field of Classification Search
CPC .. B63H 21/21; B63H 21/20; B63H 2021/216; B63H 2021/205
See application file for complete search history.

(56) References Cited

U.S. PATENT DOCUMENTS

| | | | |
|---|---|---|---|
| 2010/0167601 A1* | 7/2010 | Rzadki | B63H 21/16 440/1 |
| 2010/0274420 A1 | 10/2010 | Veit et al. | |
| 2011/0259440 A1 | 10/2011 | Kawashima et al. | |

(Continued)

FOREIGN PATENT DOCUMENTS

JP  2004359112 A2  12/2004

OTHER PUBLICATIONS

International Search Report and Written Opinion corresponding with PCT Application No. PCT/US2019/044943, filed Aug. 2, 2019, 15 pages.

*Primary Examiner* — Stephen P Avila
(74) *Attorney, Agent, or Firm* — Foley & Lardner LLP

(57) ABSTRACT

A marine vessel including a hybrid propulsion system including one or more diesel engines and electrically-driven thrusters. A hybrid propulsion management system may be configured to manage the hybrid propulsion system during free-floating, stationary operations by executing an embedded power simulation and control function that performs a real-time simulation to determine minimum RPM requirements of the diesel engine(s) for each power bus (e.g., electrical buses to which the electrically-driven thrusters are electrically connected) to fulfill a stationary position holding objective by the hybrid propulsion system of the marine vessel. By determining minimum RPM requirements for the diesel engine(s), reduced fuel consumption and emissions may be achieved, while ensuring safety of the marine vessel, closely located structures, and people.

22 Claims, 9 Drawing Sheets

(56) References Cited

U.S. PATENT DOCUMENTS

| | | | |
|---|---|---|---|
| 2012/0028516 A1* | 2/2012 | Levander | B63H 21/17 |
| | | | 440/6 |
| 2014/0187107 A1* | 7/2014 | Gemin | B63H 21/22 |
| | | | 440/3 |
| 2015/0142227 A1 | 5/2015 | Stephens | |
| 2015/0247416 A1 | 9/2015 | Flodgaard | |
| 2018/0050782 A1 | 2/2018 | Danielsson et al. | |

* cited by examiner

SYSTEM AND METHOD FOR MINIMIZING FUEL USAGE AND EMISSIONS OF A MARINE VESSEL

RELATED APPLICATIONS

This application claims priority to U.S. provisional patent application having Ser. No. 62/713,917 filed on Aug. 2, 2018; the contents of which are incorporated herein by reference in their entirety.

BACKGROUND

Managing operations of marine vessels is challenging. Marine vessels are used for a variety of functions, including cargo shipping, commercial fishing, military operations, cruising, and many other purposes. FIG. 1 is an illustration of an illustrative scene 100 including a marine vessel 102 that may be used for cargo shipping and/or for supporting oil rig operators. One aspect of managing marine vessels that are used for shipping cargo and other purposes includes maintaining stationary positions of the marine vessels while free-floating on waterways (i.e., floating on a body of water without assistance or constraints of external forces). Free-floating is typically performed at ports, near platforms or oil rigs, such as oil rig 104, near barges or other container vessels during cargo loading and unloading operations, close to shore for boarding and de-boarding operations, and many other reasons while the vessel is not docked or moored. As understood in the art, free-floating is a common practice in many different scenarios, and in each case, the marine vessel is subject to movement based on environmental forces, including wind, water current, and waves that are applied to the marine vessel. In the event of a large unexpected movement (e.g., over 1 foot) resulting from a large, unexpected environmental event, a stationary positioning system unable to counteract the environmental event may result in damage or injury to the vessel, nearby structure, and/or people.

As understood by marine vessel designers and operators, a variety of configurations of marine vessel propulsion systems exist. Hybrid propulsion systems were developed to reduce fuel used and emissions produced during operation by using electrically-driven thrusters as compared to diesel or other fuel-driven thrusters. These hybrid propulsion systems operate the main engines, most often diesel engines, by driving a shaft that ultimately drives a propulsion propeller. The electrically-driven thrusters of the hybrid propulsion system are powered by a generator that converts the rotational motion of shaft driven by the diesel engine into electricity (see, for example, FIG. 2).

Heretofore, during the stationary positioning process, vessel operators have maintained operation of the diesel engines at maximum levels, which causes drive shafts to spin at maximum capacity (RPMs) so that the electrically-driven thrusters are have maximum amount of electricity to drive electrically driven thrusters at a maximum levels, if needed, to counter unexpected environmental forces on the hull of the vessel. While such full control is beneficial to provide for safety of the marine vessel, nearby structures, and people, operating the diesel engine at maximum capacity is expensive in terms of fuel consumption and causes undesirable emissions by the diesel engines. As such, there is a need for the propulsion system to be reconfigured to reduce cost and emissions while maintaining the marine vessel in a stationary position when free-floating on a waterway.

SUMMARY

To maintain stationary control of a marine vessel with a hybrid propulsion management system including a diesel engine and electrically-driven thrusters, an embedded power simulation and control function that performs a real-time simulation is executed to determine minimum RPM requirements for each power bus (e.g., electrical buses to which the electrically-driven thrusters are electrically connected) to fulfill a position holding objective by the hybrid propulsion system of the marine vessel. The propulsion system may be configured (i) to determine maximum thrust needed based on sensor measurements (e.g., position and motion measurements, inertial measurements, global navigation satellite system measurements, wind measurements, etc.), and (ii) to adjust the diesel engine operation to a power level less than a maximum capacity RPM, but with sufficient RPM to provide electrical power to any of the electrically-driven thrusters as well as the main propellers to maintain the stationary position of the marine vessel in the event of unanticipated environmental forces on the marine vessel. That is, based on sensor signals and simulation results based on the sensor signals, the diesel engines may be operated to satisfy the power needs of one or more thrusters (e.g., electrically-driven thrusters and/or main propellers) to maintain adequate levels of safety. The lower RPMs reduce overall fuel consumption, and the effect increases as environmental conditions improve (e.g., less wind, waves, and/or water current), thereby allowing for even lower RPMs on all effectors of the marine vessel.

More particularly, in determining a power level of the diesel engine for adjustment, the simulation is executed prior to adjusting the power level of the diesel engine to a minimum power level that is sufficient to support the electrically-driven thrusters. The results of the simulation produces power level values that are thereafter used for adjusting the power level of the diesel engine that, in effect, sets the RPMs of the shafts that drive the electrical power to the electrically-driven thrusters via generators. A minimal power level may be selected from amongst a predetermined number of operational states or power levels. The simulation may determine that blades of a propeller of each of the respective electrically-driven thrusters are able to be set with an angle sufficient to produce a thrust strong enough to counteract environmental forces being applied to the marine vessel as measured by one or more sensors and by using a mathematical model (e.g., state estimator), for example. By repeatedly or continuously monitoring and adjusting the power level or RPMs of the diesel engine, fuel consumption and emissions may be reduced to save money and minimize pollution produced by the marine vessel that supplies sufficient electrical power to the electronically-driven thrusters to maintain stationary control of the marine vessel.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

Marine Vessel Hybrid Propulsion System

Figure 1:
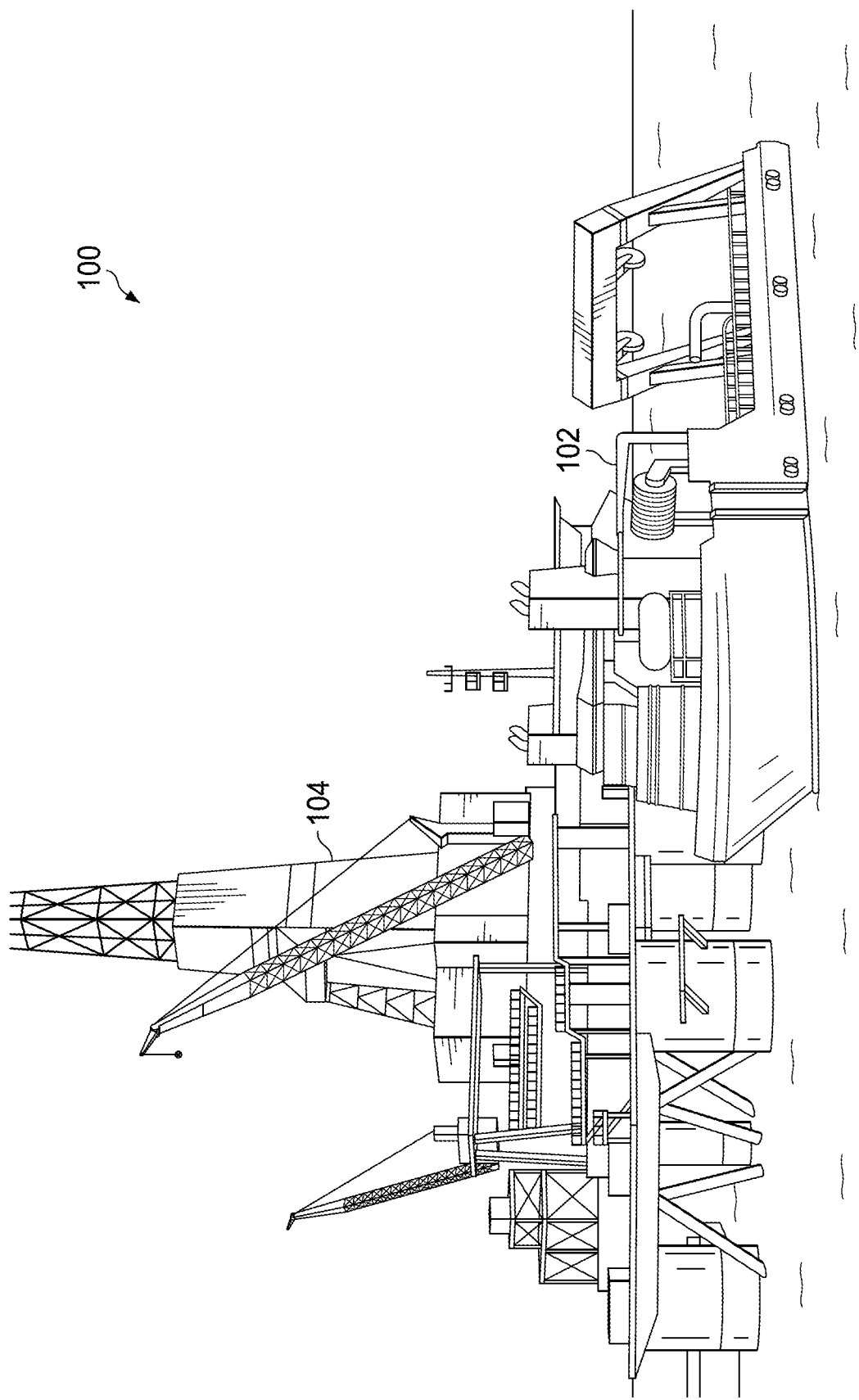
FIG. 1 is an illustration of an illustrative marine vessel with a hybrid propulsion system.
Figure 2:
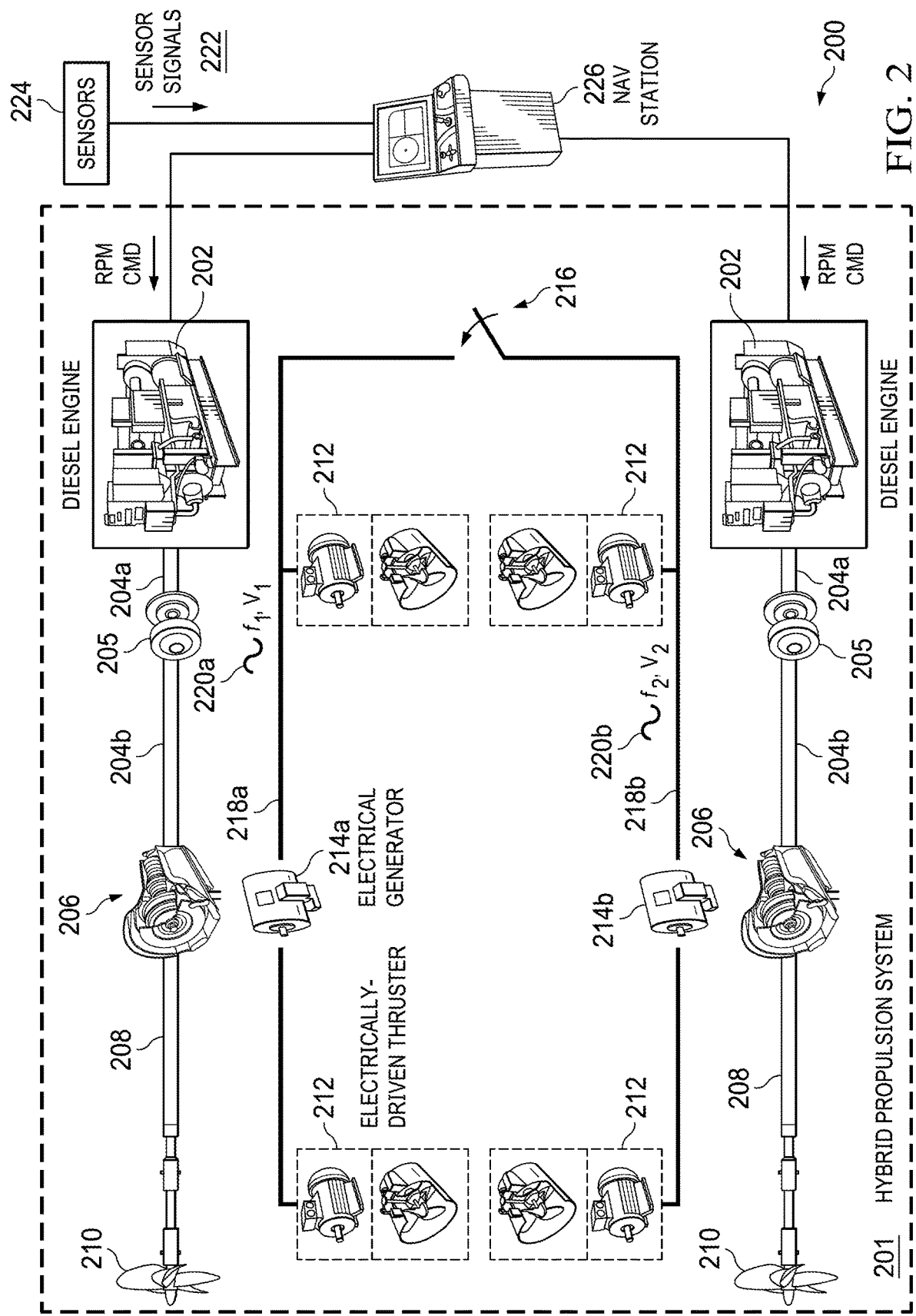
FIG. 2 is an illustration of a illustrative hybrid propulsion system inclusive of a diesel engine and electrically-driven thrusters for a marine vessel.

With regard to FIG. 2, a conventional marine vessel hybrid propulsion management system 200 inclusive of a hybrid propulsion system 201 configuration is shown that includes one or more diesel engines 202 that drives a first shaft 204a connected to a clutch 205 that connects via a second shaft 204b to a direct drive and/or gearbox 206, which, in turn, drives a third shaft 208 to drive one or more main propellers 210. The hybrid propulsion system 201 includes electrically-driven thrusters 212 to provide for side or other directional thrust. To power the electrically-driven thrusters 212, electrical generators 214a and 214b (collectively 214) may be driven by the third shaft 208, where the electrical generators 214 are configured to generate electricity in response to the rotation of the third shaft 208 that powers the electrically-driven thrusters 212 and, optionally, other electrical systems and components (e.g., power conditioners, uninterruptable power supplies, batteries, etc.) on the marine vessel.

Electrically-driven thrusters are typically, but not limited to, side thrusters or tunnel thrusters meant to assist with controlling lateral movement of the marine vessel for use in stationary positioning while free-floating, parking procedures, directional corrections while moving, or otherwise. Electrically-driven thrusters typically include propellers, but other types of thrusters may be used and pointed in any angle or direction. In an embodiment, a switch 215 may be in an OPEN state to decouple electrical buses 218a and 218b so as to enable electrical power signals 220a and 220b generated by the electrical generators 214 to have different frequencies $f_1$, $f_2$ (e.g., 33 Hz, 60 Hz) and voltage amplitudes $V_1$, $V_2$ (e.g., 33 KV, 60 KV) that are used to drive the electrically-driven thrusters 212. In an embodiment, the switch 215 may be in a CLOSED state to couple the electrical buses 218a and 218b, which may provide for equal power to drive the electrically-driven thrusters 212 and, optionally, other electrical devices.

For safety purposes, the propulsion management system 200 is meant to support sufficient control of the marine vessel when in a free-floating, stationary position to ensure that unexpected wind, waves, and/or water current are able to be compensated for by the propulsion management system 200. Historically, to ensure compensation capabilities by the propulsion management system 200, the diesel engine 202 has been operated at full or maximum capacity (revolutions per minute or RPMs) so that the generator generates sufficient electricity for the electrically-driven thrusters 212 to be able to compensate for large unexpected changes to wind, waves, and/or water current from moving the marine vessel into a structure or other vessel when free-floating and being maintained in a stationary position, for example. As understood, the propulsion management system 200 is configured to churn water at the maximum power capacity generated by the diesel engine by configuring blades of the main propeller 210 with a pitch or angle that results in minimal or no propulsion force to move the marine vessel. In operation, churning water with the propeller blades 210 is typically performed when there is minimal or no thrust requirement for the propeller blades 210, but while power delivery for the electrically-driven thrusters 212 via the electrical generators 214 is desired or required, such as during stationary positioning operations.

Sensor signals 222 measured by various sensors 224, such as position reference systems, wind sensors, inertial measurement unit(s) (IMUs), vertical reference units, and other sensors of the marine vessel are fed via communication lines into a navigation station 226 that may be configured, in part, to maintain a stationary position of the marine vessel. A combination of the sensor signals 222 may provide information of real-life or actual motion and position of the vessel along with wind and external forces acting on the hull of the vessel. The sensor signals 222 may be used by software algorithms, such as a state estimator, used to estimate and maintain the position of the vessel using a propulsion management system.

Heretofore, and as previously described, during the stationary positioning process, vessel operators maintain operation of the diesel engines 202 at maximum levels, which causes shafts 204a, 204b, and 208 to spin at maximum capacity (RPMs) so that the electrically-driven thrusters 212 are capable of being driven at a maximum levels, if needed, to counter unexpected environmental forces on the hull of the vessel. As such, propulsion system control, which is executed by the navigation station 226, is capable of preventing unexpected and undesirable movement of the marine vessel as maximum power is made available to the electrically-driven thrusters 212. While such full control is beneficial to provide for safety of the marine vessel, nearby structures, and people, operating the diesel engine at maximum capacity is expensive in terms of fuel consumption and causes undesirable emissions by the diesel engines 202. As such, there is a need to alter configuration and operation of the hybrid propulsion management system 200 while maintaining the marine vessel in a stationary position while free-floating on a waterway.

Marine Vessel Dynamic Positioning System

The amount of fuel consumed and emissions produced by marine vessels is generally considered significant when a diesel engine operates at full capacity. When marine vessels operate in a stationary mode to maintain the marine vessel in a free-floating, stationary position on a waterway, marine vessel operators historically maintain the diesel at full capacity so as to ensure sufficient power for the electrically-driven thrusters is available to control stationary position of the marine vessel for worst case scenarios. A stationary position of a marine vessel may be within a couple inches or less. With hybrid propulsion systems, such as that shown in FIG. 2, the electrically-driven thrusters are meant to prevent undesirable horizontal and/or longitudinal motion of the marine vessel to avoid damaging the vessel, nearby structures, and/or nearby vessels and avoid injuring people on the vessel, nearby structures, and/or nearby vessels.

As a result of the use of a hybrid propulsion system, fuel and emissions are reduced by using the electrically-driven thrusters. However, the diesel engine still consumes significant fuel and produces emission while operating at full capacity. Depending on the environment forces, such as wind, waves, and/or water current, the amount of available power needed to control the motion of the marine vessel by the electrically-driven thrusters may be determined as a function of the environmental forces on the vessel. In other words, so long as the electrically-driven thrusters have sufficient available power or RPMs to satisfactorily control the marine vessel under the existing or predicted environmental conditions, then additional power provided to the electrically-driven thrusters as generated by electrical generator(s) that are driven by a shaft rotated by the diesel engine is unnecessary. Hence, a minimization of the RPMs of the shaft driven by the diesel engine can be determined that generates sufficient electrical power to drive the electrically-driven thrusters.

In an embodiment, a simulation may be repeatedly executed to determine the amount of electrical power for sufficiently enabling the electrically-driven thruster(s) to counteract environmental forces, as optionally measured by on-board sensors (e.g., wind sensors, GPS sensors, inertial measurement unit sensors, etc.), being applied to the marine vessel. The results of the simulation may be used to adjust RPMs of the diesel engine to minimize fuel consumption and emissions. By continuously or repeatedly executing the simulation and determining the minimum RPMs that provide sufficient power for the electrically-driven thruster(s) to sufficiently prevent or minimize movement of the marine vessel, a reduction in fuel consumption and emissions may result.

Figure 3:
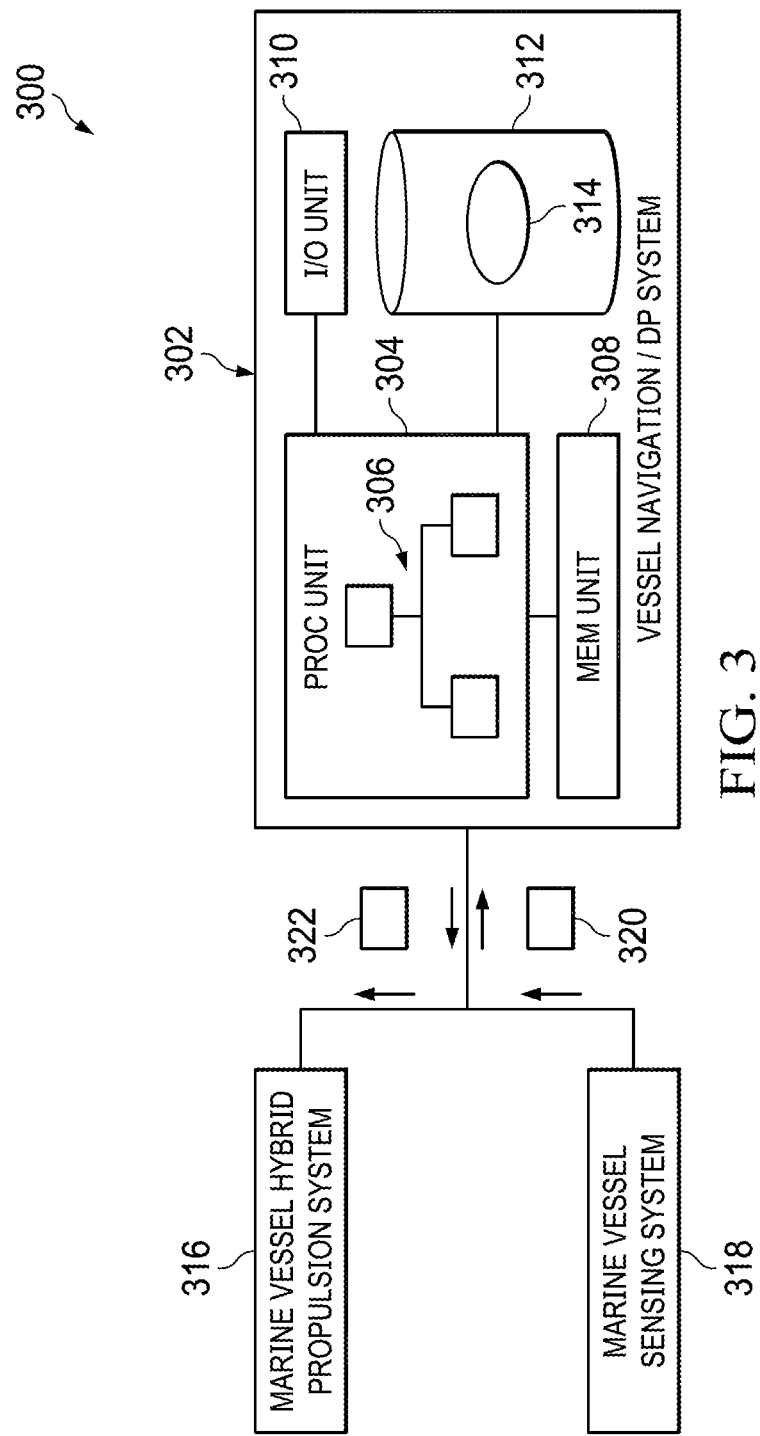
FIG. 3 is a block diagram of an illustrative marine vessel propulsion management system that may be integrated into a hybrid propulsion system inclusive of a navigation system with dynamic positioning functionality for maintaining a marine vessel in a stationary position.

With regard to FIG. 3, a block diagram of an illustrative marine vessel propulsion management system 300 inclusive of a navigation system with dynamic positioning (DP) functionality for maintaining a marine vessel in a stationary position while free-floating on a waterway is shown. The system 300 may include a vessel navigation/dynamic positioning (DP) computer system 302. The computer system 302 may include one or more computers that, in conjunction, are configured to control navigation and dynamic positioning to maintain a vessel in a stationary position, for example, while free-floating on the waterway.

The computer system 302 may include a processing unit 304 that includes one or more computer processors, such as general processors or specific processors (e.g., digital signal processors, image processors, ASICs, or any other types of general or specific processors, as understood in the art). The processing unit 304 may be configured to execute software 306 that may perform the functionality for supporting vessel navigation and dynamic positioning, such as stationary positioning, as further described herein. The processing unit 304 may be in communication with a memory unit 308 that includes non-transitory memory configured to store data and software code, input/output (I/O) unit 310 configured to communicate data via a communications network, such as a data bus to other systems throughout the marine vessel and/or wireless communications network (e.g., local wireless communications network and wide area network) using any communications protocol for communicating data over the various networks and buses, as understood in the art. The processing unit 304 may further be in communication with a storage unit 312 that may include one or more hard drives, static memory, dynamic memory, or otherwise, on which one more data repositories 314 that include data used to manage the various processes being executed by the processing unit 304 are stored.

The system 300 may include a marine vessel hybrid propulsion system 316 that includes a diesel engine configured to drive a main propeller of the marine vessel and electrically-driven thrusters that receive electrical power from an electrical generator, such as shown by the hybrid propulsion system 201 of FIG. 2. Marine vessel sensing system 318 may include one or more sensors that are used for sensing forces on the marine vessel from environmental conditions, such as wind, waves, and water currents. In an embodiment, the marine vessel sensing system 318 may include a variety of sensors, as understood in the art, including wind speed and wind direction sensors, GPS devices, electrical current sensors, inertial measurement unit (IMU) that includes accelerometers and gyroscopes, and any other sensor that may sense and measure operational and/or environmental forces on the marine vessel, as understood in the art, position of the vessel, and/or vessel operational forces.

In operation, the marine vessel sensing system 318 may be configured to sense environmental and/or vessel operational forces and positional data, and generate sensor data 320 representative of those environmental forces and/or vessel operational forces. The data 320 may be communicated from the sensing system 318 to the navigation/DP computer system 302 for processing thereby. The processing unit 304 may be configured to receive and store the data 320 in a data repository 314. The software 306 may be configured to execute a simulation and/or mathematical model that simulates how the forces from the received data 320 may potentially impact the marine vessel, and the amount of counteracting forces needed to maintain the stationary position of the marine vessel free-floating on the waterway. More particularly, the simulation may be configured to determine how much electrical power is needed by the electrically-driven thrusters or main thruster(s) (e.g., main propeller(s)), and RPMs of a shaft driven by the diesel engine for causing the needed amount of electrical power to be consumed by the electrically-driven thruster and/or other electrical systems. Moreover, the simulation may be configured to determine different amount of electrical power to be provided by each diesel engine if power buses of the respective diesel engine are decoupled, as provided in FIG. 2. The simulation may further determine frequency and amplitude of respective sinusoidal power signals. To accommodate for the main thrusters to provide force to maintain position of the vessel, the simulation may determine angle(s) of the propeller(s). In an embodiment, the simulation may be configured to step through multiple power levels (e.g., 10%, 20%, . . . , 90%) or RPM levels (e.g., 1000 RPMs, 1250 RPMs, 1500 RPMs, etc.) of the diesel engine to generate sufficient electrical power to drive the electrically-driven thrusters of the hybrid propulsion system 316.

Figure 4:
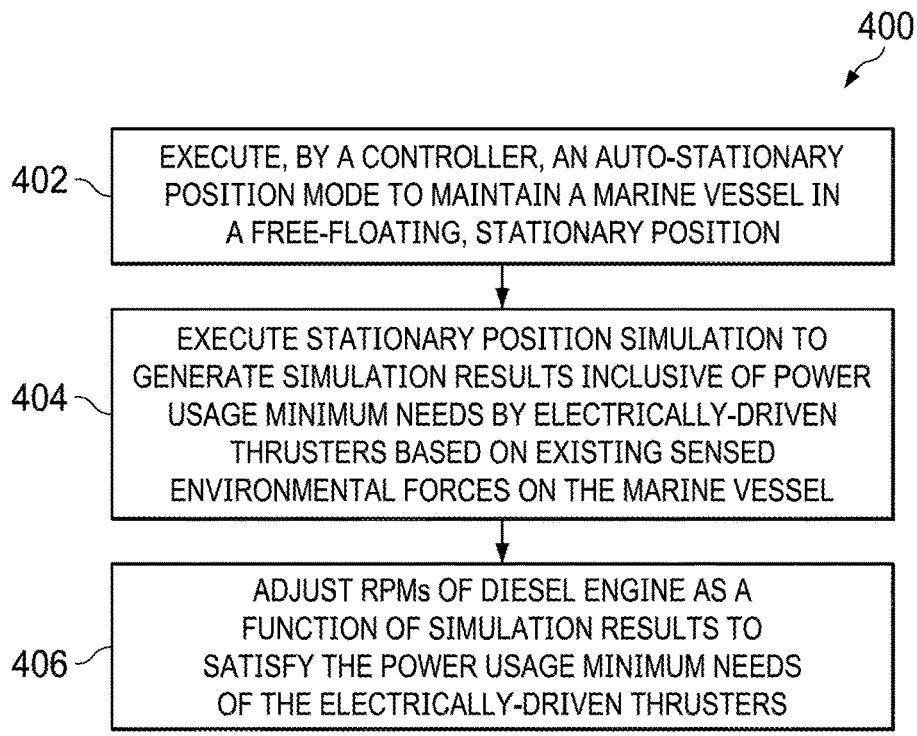
FIG. 4 is a flow diagram of an illustrative process for a controller to maintain a marine vessel in a stationary position.

With regard to FIG. 4, a flow diagram of an illustrative process 400 for a controller to maintain a marine vessel in a stationary position is shown. The process 400 may start at step 402, where an auto-stationary position mode may be executed by a controller to maintain a marine vessel in a free-floating, stationary position. As previously described, the auto-stationary position mode may be used to counteract any environmental forces, such as wind, waves, and/or water current, being applied to the marine vessel. The environmental forces and positional information may be measured by sensors on the marine vessel, as previously described. The auto-stationary position mode may be activated by an operator of the marine vessel at a helm of the marine vessel or remote if the marine vessel is remotely controlled. In an embodiment, if the marine vessel is an autonomous marine vessel, the controller may automatically turn on the auto-stationary position mode at a destination location, stopping point (e.g., loading zone), or otherwise.

At step 404, a stationary position simulation may be executed to generate simulation results inclusive of power usage minimum needs by electrically-driven thrusters based on existing sensed environmental forces on the marine vessel. Predicted needs for the electrically-driven thrusters may also be determined by receiving remotely sensed environmental forces, such as wind speed, waves, and/or water currents. In an embodiment, the stationary position simulation may be executed continuously, periodically, or aperiodically. If the simulation is executed continuously, the sensor measurements of environmental forces that are updated may be applied to the simulation as inputs, and the simulation may be executed in response to those environmental forces. If the simulation is executed periodically, the simulation may be executed on a periodic basis, such as at a certain frequency (e.g., 1 Hz, 100 Hz, or 1000 Hz). If the simulation is executed aperiodically, then the simulation may be executed in response to an event, for example. In an embodiment, the event may be a change in an environmental force by a certain amount over a certain time period (e.g., increase in wind speed for over 30 second continuous duration). Alternatively, the event may be a change in sensor value (e.g., acceleration of 0.1 m/sq-s).

At step 406, one or more diesel engines operating as main engine(s) of the marine vessel may be adjusted as a function of the simulation results to satisfy minimum needs of the electrically-driven thrusters. If, for example, the simulation results indicate that the electrically-driven thrusters require higher electrical power to ensure that the electrically-driven thrusters have sufficient RPMs to counteract environmental forces to maintain a substantially fixed position of the marine vessel, then the number of RPMs that the diesel engine(s) are rotating may be increased to increase speed of a shaft that is driving an electrical generator, such as the electrical generators 214 shown in FIG. 2. Similarly, if the environmental forces have subsided, then the number of RPMs of the diesel engine may be reduced, thereby reducing fuel consumption and emissions. In an embodiment, if the simulation determines that electrical power is needed on only one side of the vessel due to wind blowing from port to starboard, for example, then the system may decouple multiple diesel engines and change RPMs of only one diesel engine, such as the starboard diesel engine. It should be understood that additional electricity consumption devices of the marine vessel may be incorporated into the simulation to produce a minimum number of RPMs of the diesel engine may be included. For example, measurements of existing power usage may be made and added to the electrical power needs of the electrically-driven thrusters.

Figure 5:
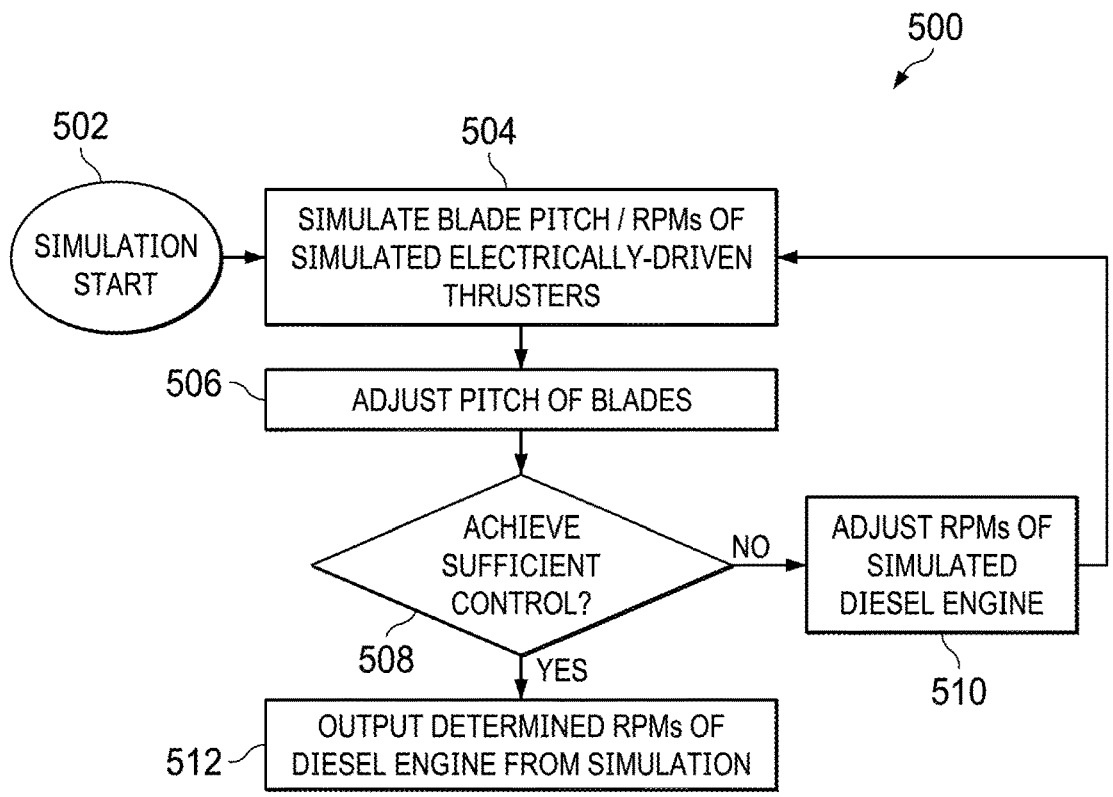
FIG. 5 is a flow diagram of a simulation process for simulating control of a propulsion system inclusive of a diesel engine and electrically-driven thrusters while maintaining a simulated marine vessel in a stationary position while free-floating on a waterway.

With regard to FIG. 5, a flow diagram of a simulation process 500 for simulating control of a propulsion system inclusive of a diesel engine and electrically-driven thrusters while maintaining a simulated marine vessel in a stationary position while free-floating on a waterway is shown. The simulation process 500 may start at step 502. At step 504, a simulation of electrically-driven thrusters with adjustable blades (e.g., propellers) may be made. The simulation of the electrically-driven thrusters may include adjusting blade pitch. As understood in the art, blade pitch of propellers, for example, may be adjusted to change an amount of thrust produced by the thrusters, where the thrusters may produce less thrust with less pitch, and the thrusters may produce higher thrust with more pitch. In executing the simulation, an amount of simulated pitch may be set to a less-than-full amount (e.g., 50%), thereby ensuring that additional amounts of thrust is available in case the environmental forces change. The simulation may also set the simulated pitch of the blades to a full amount to determine a maximum amount of electrical power needed to drive the simulated electrically-driven thrusters with maximum resistance. In an embodiment, in addition to the simulation determining power needs of the electrically-driven thrusters, as part of or independent from the simulation of the electrically-driven thrusters, the simulation may include mathematics for determining needs by the main thruster(s) of the vessel, where the simulation for the main thruster may include simulating adjustment of the pitch and/or speed of the propeller of the main thruster(s). By simulating the main thruster(s), environmental forces that impact forward and reverse motion of the vessel may be counteracted.

At step 506, pitch of the simulated blades of the simulated electrically-driven thrusters may be adjusted. The adjustment may be made to one or more of the simulated electrically-driven thrusters to determine an amount of blade pitch needed to counteract environmental forces to determine the amount of power needed to maintain the marine vessel in a fixed position. If the pitch of the blade(s) of the electrically-driven thrusters is higher than a certain amount, then the simulation may be set to apply higher rotation to offset the amount of pitch. To support such a function, at step 508, a determination as to whether sufficient control is achieved may be made. If the control is insufficient (e.g., the maximum allowed pitch of the pitch of the blades of the thruster has been reached and the environmental forces on the vessel are simulated to move the marine vessel without sufficient counteraction by the simulated electrically-driven thrusters), then the process 500 may continue at step 510, where the RPMs of the simulated diesel engine may be increased to support higher RPM needs of the electrically-driven thrusters. The increase may be a certain amount, such as 50 RPM. In an alternative embodiment, rather than using RPMs, power levels may be used. For example, an initial setting of power level of the simulated diesel engine may be 30% of full power, and step increases of 10% may be used until a percentage that satisfies the electrical power needs of the simulated electrically-driven thrusters is reached. Other initial percentages and step increases may be utilized, as well. The simulation 500 may return to step 504 to repeat simulating the blade pitch/RPM adjustment. If sufficient control is achieved at step 508, then the process continues at step 512, where the determined RPMs of the diesel engine is output from the simulation to be applied to the actual diesel engine. In addition to adjusting pitch of the blades of the electrically-driven thrusters during the simulation, pitch of the blade(s) of the main thruster of the vessel may also be adjusted in the simulation.

In an embodiment, the RPMs may be set up for different levels (e.g., RPMs spaced at different levels, such as 100

RPMs spacing), different levels of output horsepower by the diesel engine (e.g., horsepower spaced at different levels, such as 10% spacing), or otherwise. By simulating stepping through different spacing of RPMs or horsepower, the simulation may operate over specific, discrete simulated levels when determining a number of RPMs for the diesel engine (s) to operate so that a proper level may be selected to drive the actual diesel engine(s). For example, the simulation may step through multiple RPMs (e.g., simulate by simulating 50 RPM or 100 RPM steps of the diesel engine, and determine which of the steps provides the lowest RPMs that are sufficient for providing enough electrical power for the electrically-driven thrusters to counteract environmental forces on the marine vessel). The simulation, of course, may be configured to model the different electrical, mechanical, and electromechanical devices to more accurately determine an amount of electrical energy produced by the generator(s) that are being driven by a shaft that is directly or indirectly driven by the diesel engine.

In operation, a variety of additional features of the process may be utilized. For example, in executing the stationary position simulation to generate simulation results inclusive of power usage minimum needs by the electrically-driven thrusters may include setting angles of simulated electrically-driven thrusters to maximum thrust angles. Alternatively, the angles of the simulated electrically-driven thrusters may be set to one or more angles less than maximum angles. In an embodiment, a simulated diesel engine may be stepped through a series of RPMs to cause a simulated electricity generator model to produce simulated electricity to drive simulated electrically-driven thrusters to determine whether a maximum force to counteract the environmental forces is achievable by the electrically-driven thrusters of the marine vessel at each RPM level.

Executing the simulation may further include limiting a maximum rotation rate of the simulated electrically-driven thrusters to be less than a predetermined rate (e.g., less than about 80% of maximum RPMs of the diesel engine). Executing the simulation may also include using simulated electrically-driven thrusters that include simulated propellers. Executing the simulation may further include (i) determining maximum power of the simulated electrically-driven thrusters with simulated blades of propellers at any angle to produce maximum force, (ii) determining RPMs of the diesel engine needed to drive a generator to enable electrically-driven thrusters to produce the maximum force; and (iii) determining the maximum RPMs from a pre-established set of RPMs. Adjustment of RPMs of the simulated diesel engine may factor in forward and reverse forces on the vessel, as well.

The process may further include receiving measurement signals, such as wind speed and direction, inertial, location, etc., from sensors to determine environmental forces being applied to the marine vessel. The simulation may be executed to determine, based on the received environmental forces, a maximum force to be produced by any of the electrically-driven thrusters to offset the environmental forces. A minimum number of RPMs may be selected for the diesel engine from a selectable set of minimum RPMs. The diesel engine may be caused to operate at the selected minimum number of RPMs. The electrically-driven thrusters may be continuously, periodically, or aperiodically (e.g., responsive to an event, such as measuring a wind gust over a certain level) adjusted to maintain the marine vessel in the stationary position while the diesel engine is operating at the selected minimum number of RPMs.

In an embodiment, the simulation may be repeatedly executed between each actual command to control the number of RPMs of the actual diesel engine. In repeatedly executing the simulation, a determination may be made as to whether angle(s) of blades of the electrically-driven thrusters and/or main thruster(s) are capable of maintaining the stationary position of the marine vessel, and if not, rerunning the simulation with different angle(s) and/or RPMs of the simulated diesel engine(s), otherwise, not re-running the simulation. In an embodiment, a measurement of an amount of electrical power being drawn by other electrically-driven devices on the marine vessel may be made, and the simulation may be configured to include the amount of electrical power being drawn by the other electrically-driven devices in generating the simulation results.

Figure 6:
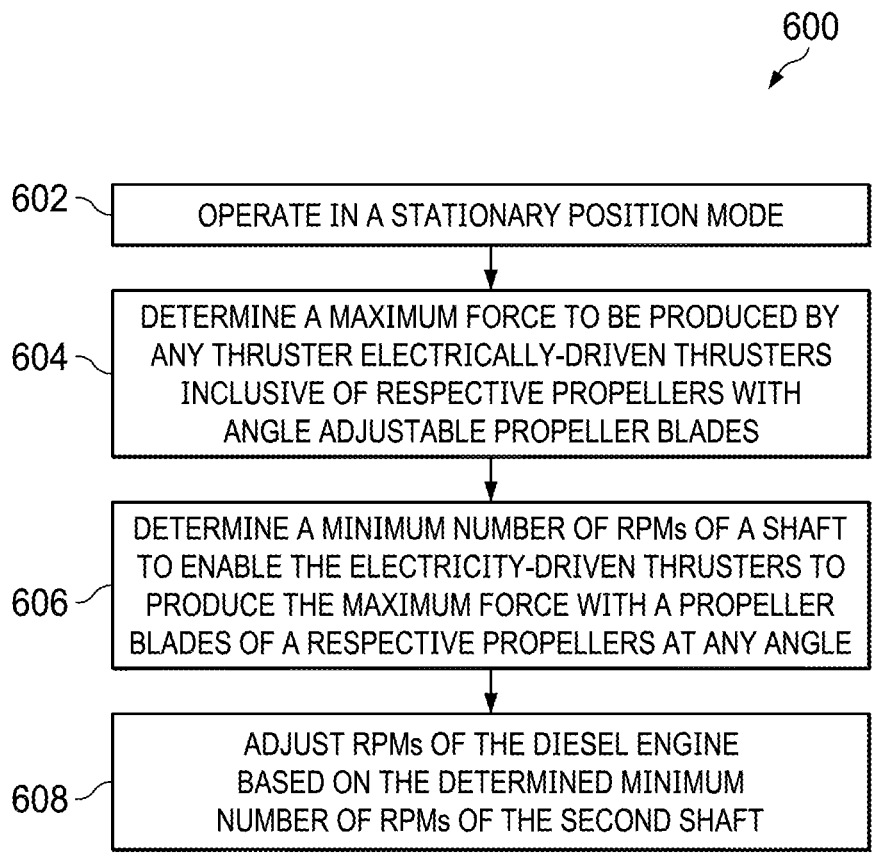
FIG. 6 is a flow diagram of an illustrative process for operating in a stationary position mode to cause the marine vessel to maintain a stationary position while free-floating on a waterway.

With regard to FIG. 6, a flow diagram of an illustrative process 600 for operating in a stationary position mode to cause the marine vessel to maintain a stationary position while free-floating on a waterway is shown. The process 600 may start at step 602, where a controller of the marine vessel is set to operate in a stationary position mode.

At step 604, a determination, based on environmental forces and/or position of the vessel, of a maximum force to be produced by any electrically-driven thrusters inclusive of respective propellers with angle adjustable propeller blades may be made. The determination may use any sensed parameter, such as rotational force on the vessel, translational force on the vessel, position of the vessel, or otherwise. A determination of maximum force to be produced by main thrusters may also be performed. The determination may be made by executing a simulation that models electromechanical, electrical, and/or mechanical systems and/or components of the marine vessel. The maximum force may be a maximum amount of force that the electrically-driven thrusters are to be able to produce to ensure that stationary positioning of the marine vessel may be achieved. In an embodiment, the angle of the adjustable propeller blades may be adjustably simulated to be at a maximum angle or to range from a minimum to a maximum (or any angle therebetween) to determine amount of electrical power needed to supply the electrically-driven thrusters at the simulated angles. Angle of the main propellers may also be determined by the same or different simulation.

At step 606, a minimum number of RPMs of the shaft to enable the electricity-driven thrusters to produce the maximum force with a propeller blades of respective propellers at any angle, such as the maximum angle, may be determined. That is, based on the amount of force to be produced by the electrically-driven thrusters, a determination as to the minimum number of RPMs of the shaft that is directly or indirectly driven by the diesel engine may be determined to ensure that enough electrical power can be generated to meet the demand of the simulated force by the electrically driven thrusters. The minimum number of RPMs may be determined as part of the simulation.

At step 608, the RPMs of the actual diesel engine(s) may be adjusted based on the determined minimum number of RPMs of the second shaft. That is, a controller may cause the actual diesel engine(s) to rotate at a rate that shaft directly or indirectly driven by the diesel engine(s) a determined minimum number of RPMs as determined by the simulation to maintain the marine vessel in a stationary position while free-floating on a waterway (i.e., not constrained by an external force, such as a fixed (e.g., pier) or non-fixed (e.g., anchor restraint)).

Figure 7:
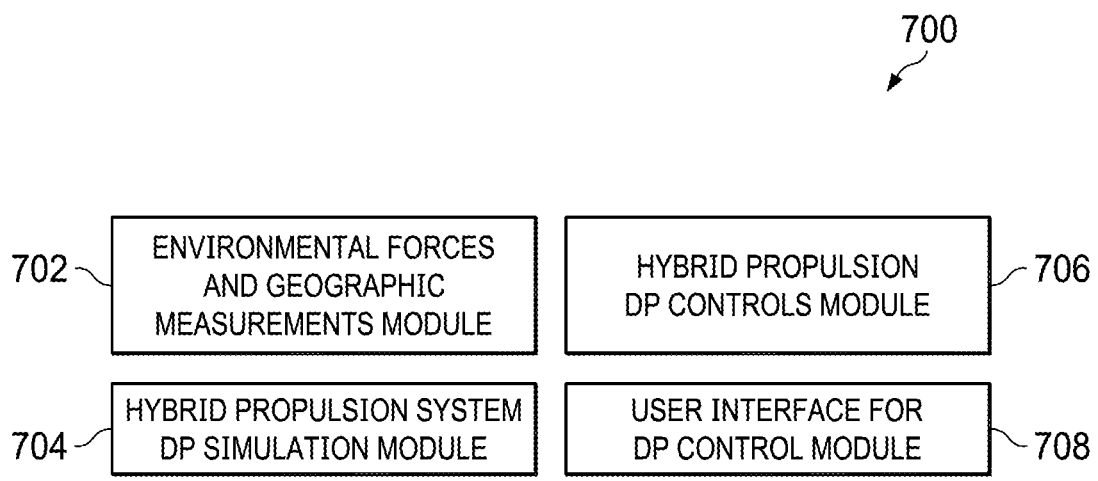
FIG. 7 is a block diagram of an illustrative set of software modules executed by a controller, and used in controlling stationary position of a marine vessel with a hybrid propulsion system free-floating on a waterway while minimizing fuel usage.

With regard to FIG. 7, a block diagram of an illustrative set of software modules 700 executed by a controller, and used in dynamically controlling a stationary position of a marine vessel with a hybrid propulsion system on a body of water while minimizing fuel usage is shown. The modules 700 may include an environmental forces and geographic position measurements module 702 that is configured to measure environmental forces on the marine vessel and/or geographic position of the vessel. The module 702 may be configured to poll and/or receive electrical signals from sensors on the marine vessel along one or more axes (e.g., x-, y-, and z-axes). The sensors may be configured to measure velocity, acceleration, and/or rotation changes of the marine vessel, wind speed and direction, and/or position of the vessel. Such sensors may include geographical position, wind speed, wind direction, accelerometers, and/or gyroscopic sensors, wind speed and direction sensor(s), and positioning sensors, such as GPS or other absolute or relative position measurement system, as understood in the art. It should be understood that additional and/or alternative sensors capable of producing measurements of environmental forces on the marine vessel may be utilized. The environmental forces may be used for determining an amount of counteractive forces needed to maintain the marine vessel in a stationary position by a simulation, for example, as described herein.

A hybrid propulsion system dynamic positioning simulation module 704 may be a simulation that is continuously and/or repeatedly executed in determining how much electric power is needed to maintain the marine vessel in a stationary position while floating on the body of water. In an embodiment, the simulation may specifically be configured for a hybrid propulsion system, such as previously described with regard to FIG. 2. It should be understood that alternative configurations of hybrid propulsion systems may be utilized, as well. The simulation may be configured to apply the existing environmental forces and/or geographic position to a dynamic model of the marine vessel including the hybrid propulsion system so as to determine an amount of electrical power needed to power the electrically-driven thrusters and/or main thruster(s) that are driven by a generator that is powered by a shaft driven by a diesel or any other main engine(s). In operation, the simulation may be configured to follow the simulation process of FIG. 5. It should be understood that any alternative process for the simulation may be performed in determining speed at which a shaft that is driving an electrical generator should be driven to provide sufficient power to support thrust needs to maintain the marine vessel may be utilized.

The simulation may take on a wide range of detail. For example, the simulation may be a static set of equations that are mathematical models of the electromechanical, electrical, mechanical, pneumatic, and/or hydraulic systems, and include the environmental forces being applied to the marine vessel. In an embodiment, a state estimator, such as a Kalman filter, may be included as part of the simulation. Statistical, dynamic modeling may be included to include possible variations in the simulation based on possible unknown factors, such as average wind speed. Monte-Carlo or other simulation techniques may additionally be used as part of the simulation. Depending on the frequency of operation, the simulation may include more or fewer details. If the vessel is being dynamically positioned with low environmental factors (e.g., low wind and/or low water current), then the simulation may operate at a lower frequency as compared to the vessel being dynamically positioned with high environmental factors (e.g., high wind and/or high water current).

A hybrid propulsion system dynamic positioning (DP) controls module 706 may provide for driving the actual hybrid propulsion system while controlling the marine vessel in a stationary positioning mode of a marine vessel. That is, the module 706 may be configured to compute equations for determining variables for RPMs for the diesel engine(s) and electrically-driven thrusters to counteract environmental forces currently being applied to the marine vessel. The variables may include power of the electricity-driven thrusters, shaft rotation, angle of propeller(s), etc. The module 706 may also be configured to determine variables for RPMs and/or propeller angle of a main propeller of the vessel. The module 706 may compute the variables as a function of the output values of the simulation module 704.

A user interface for DP control module 708 may be configured to provide an operator with a user interface to set up a stationary positioning mode. In an embodiment, the user interface may simply be a soft-button, hard-button, knob, or any other mechanism on a user interface or a control panel that the operator uses to control the operation and/or functionality of the marine vessel. In an embodiment, the module 708 may allow for a variety of options depending on desire of the operator and level of control needed for the marine vessel. For example, if the marine vessel is near a structure (e.g., within 10 meters), then the level of control may be higher than if the nearest structure is 100 or 1000 meters away from the marine vessel. The dynamic positioning control may be set to low, medium, or high, for example, depending on the desire of the operator. If, for example, the amount of control is set to high, then the simulation module 704 may be executed more often than if the amount of control is set to low. Moreover, if the amount of control is set to low, then the diesel engine RPMs may be set lower than if higher control is set. In an alternative embodiment, a single setting may be set such that the simulation module 704 may operate at the highest level that ensures minimal movement of the marine vessel while in the stationary positioning mode.

With regard to FIGS. 8-11, graphs including a set of illustrative power curves showing a comparison between the use of operating one or more diesel engines at a full power level and at lower, variable power levels during stationary positioning of a marine vessel are shown. It should be understood that that full power level may be a maximum or below maximum power level, but be at power level that is not based on actual needs, but rather higher, and typically significantly higher, than current or predicted actual needs, as provided herein.

Figure 8:
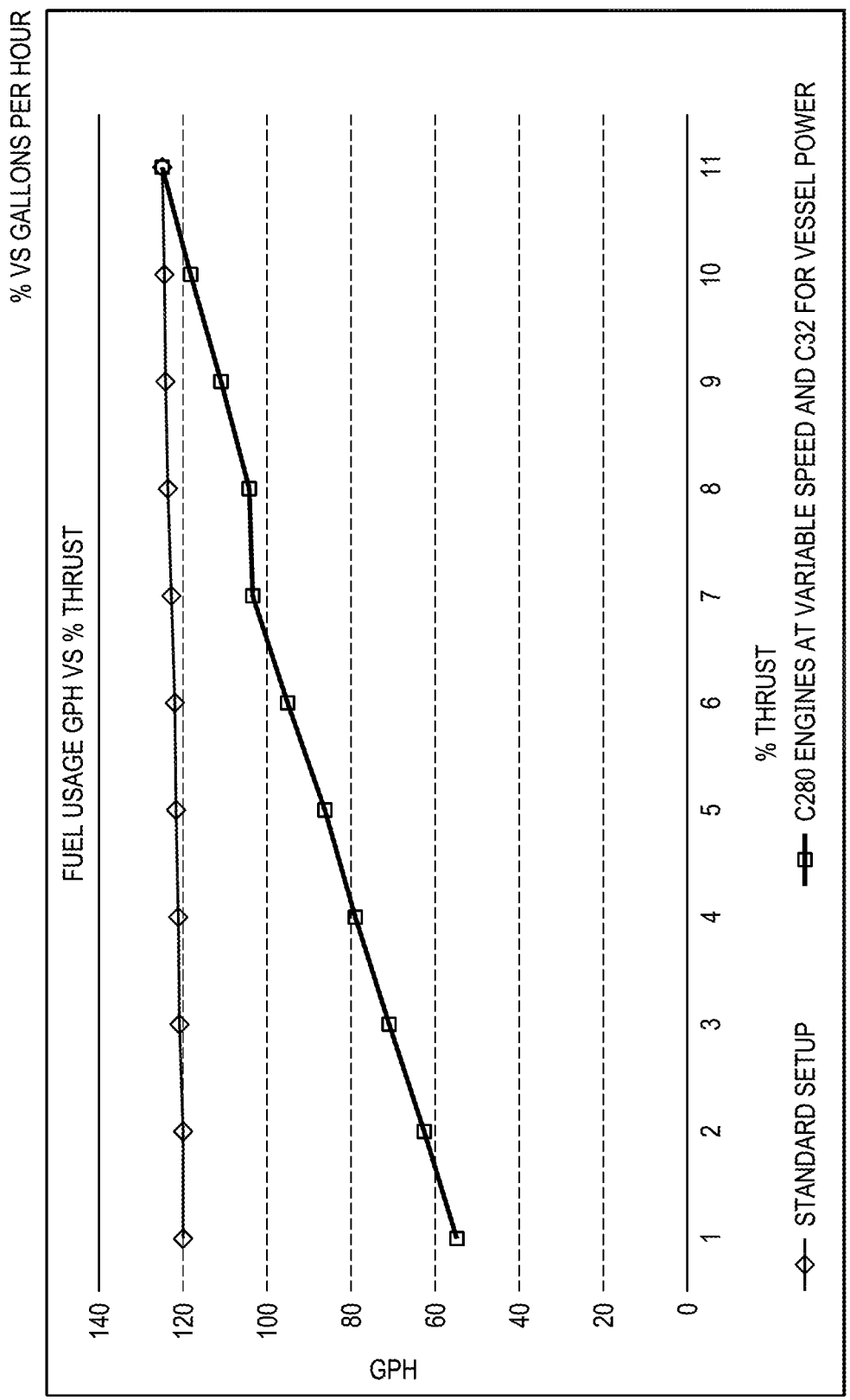
FIGS. 8-11 are graphs including a set of illustrative power curves showing a comparison between operating one or more diesel engines at full power and at lower, variable power levels during stationary positioning of a marine vessel.

With regard to FIG. 8, a graph including a comparison between a standard setup of a marine vessel with a hybrid propulsion system with diesel engines operating at full power versus operating at variable speed, as previously described, is shown. At lower percentages of thrust, fuel usage in gallons per hour using variable speed diesel engine power is about a 50% less than when the diesel engines are operated at full power.

Figure 9:
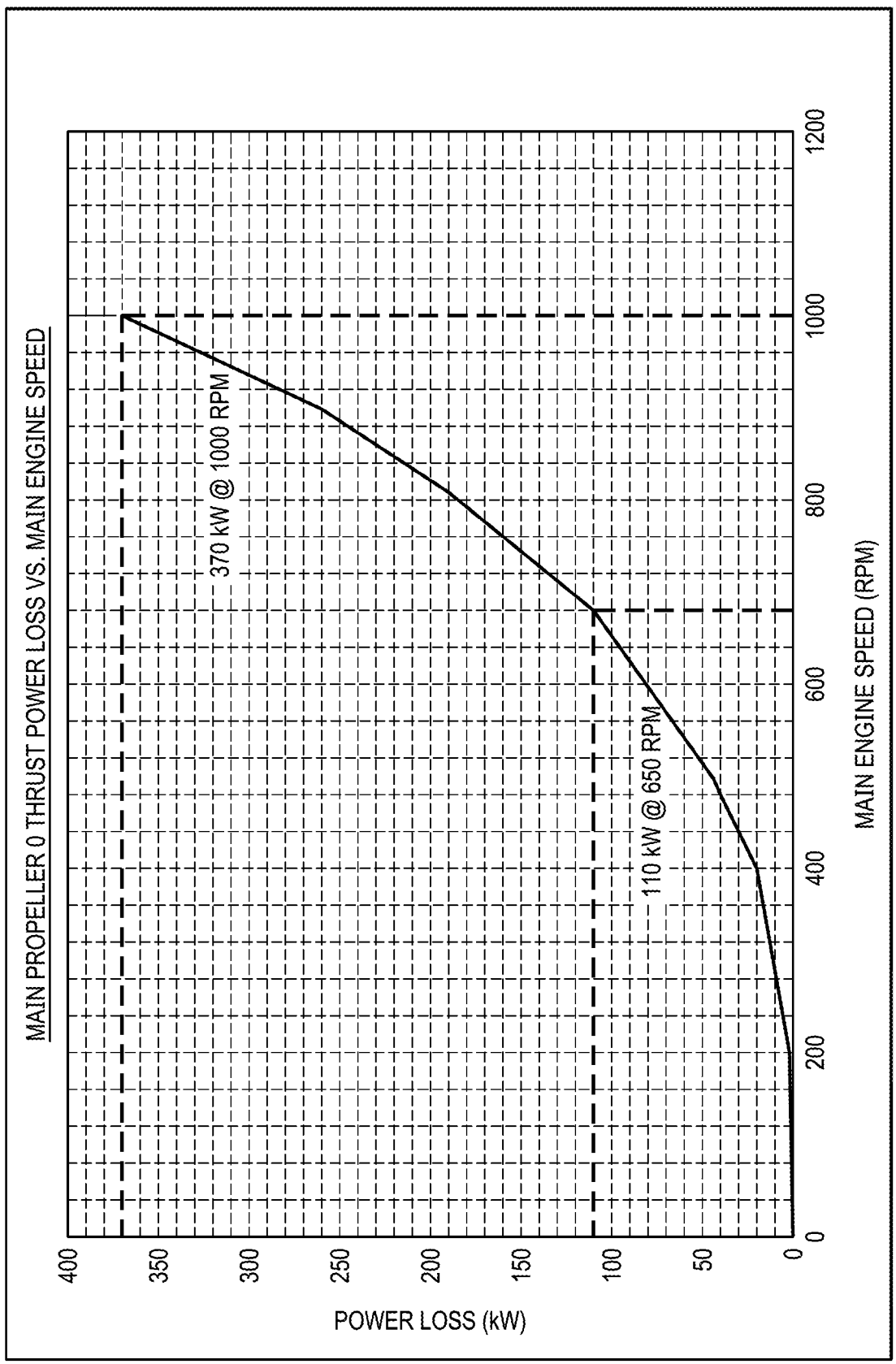

With regard to FIG. 9, a graph including a comparison between a standard setup of a marine vessel with a hybrid propulsion system with diesel engines operating at full speed versus operating at variable speed, as previously described, is shown. At low engine speeds, 0-thrust propeller losses are significantly lower (less than half) of losses incurred by running the engines/propellers at full speed.

Figure 10:
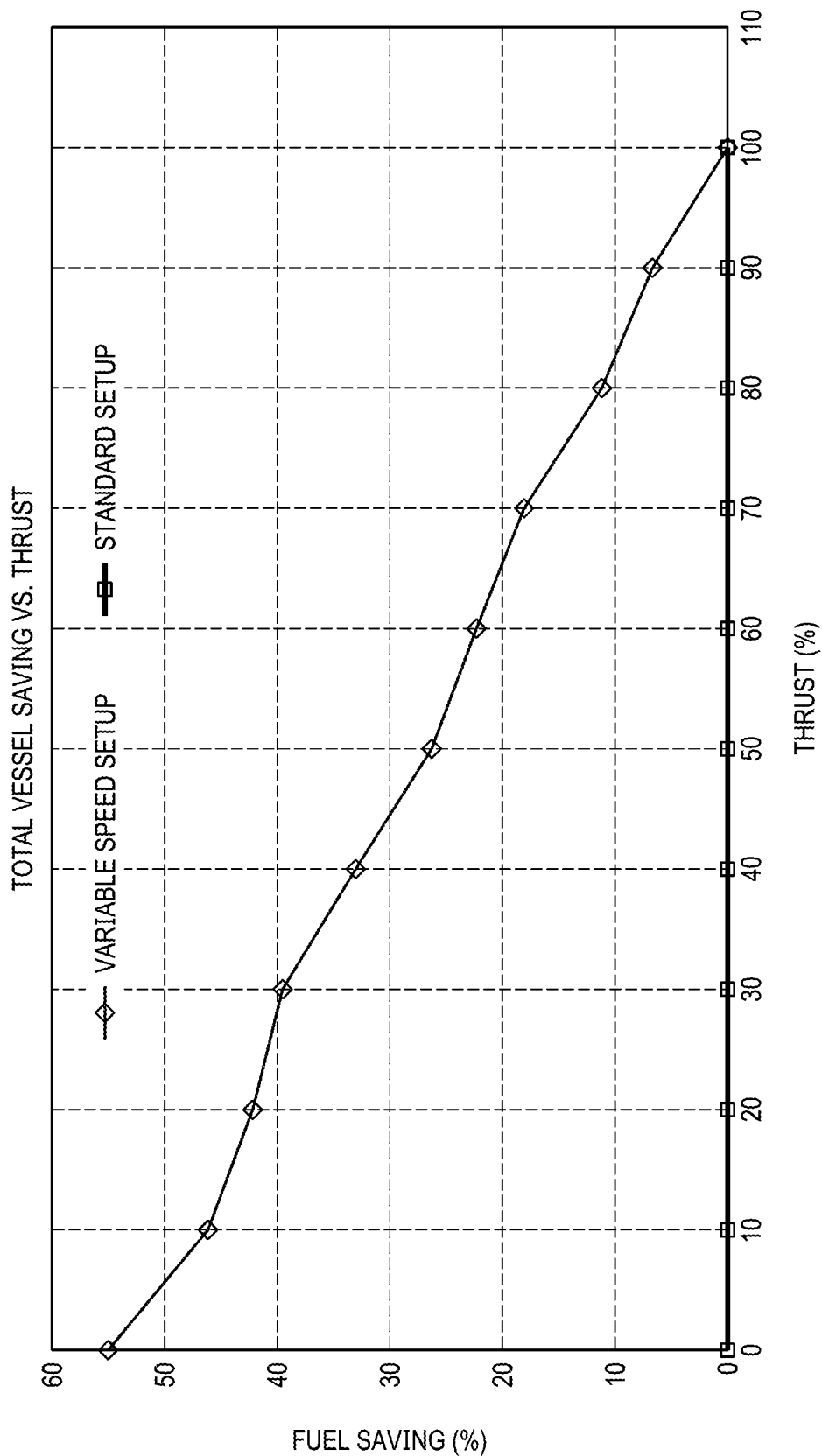

With regard to FIG. 10, a graph including a comparison between a standard setup of a marine vessel with a hybrid propulsion system with diesel engines operating at full power versus operating at variable speed, as previously described, is shown. The standard setup is shown to be at 0 since being compared to itself, while percent savings when operating the engines at a variable speed is significant, upwards of 50%, at low power levels.

Figure 11:
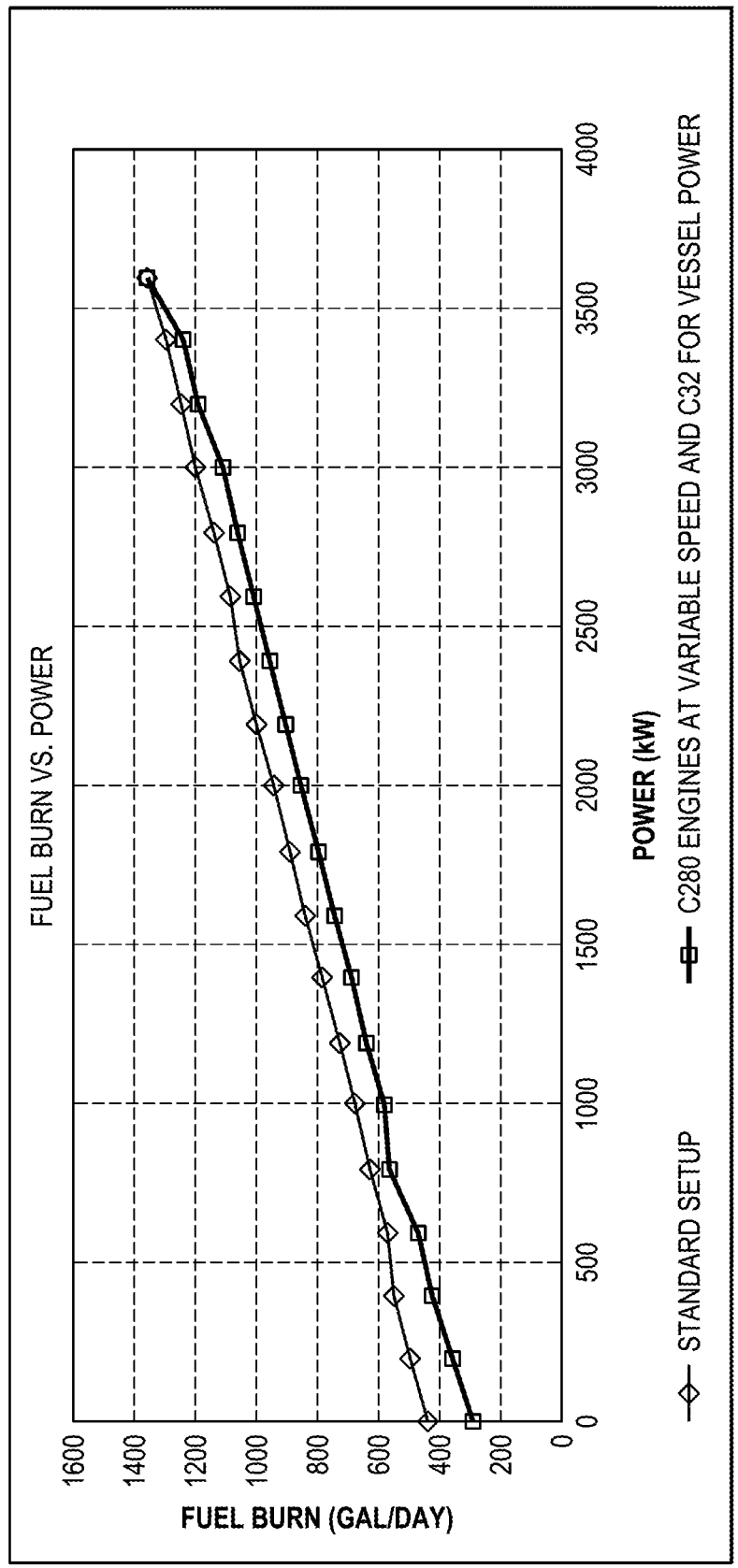

With regard to FIG. 11, a graph including a comparison between a standard setup of a marine vessel with a hybrid propulsion system with diesel engines operating at full power versus operating at variable speed, as previously described, is shown. In this graph, fuel burn versus power curves of the two different operations of the propulsion system are shown. The fuel burn versus power curve for the variable speed operation is lower than the operation of the propulsion system at full power, thereby showing how fuel is conserved.

From FIGS. 8-11, the hybrid propulsion system that is capable of operating at variable speed, which allows for lower than full power, while free-floating in a stationary position provides for a cost effective and environmentally friendly solution. Moreover, such a stationary position or parking mode may provide adequate safety through the use of a simulation operating on a navigation computing system to ensure maximum power of electrically-driven thrusters to ensure that unexpected environmental forces, such as wind, waves, and current, do not significantly displace (e.g., more than approximately 3 feet) a stationary position of the free-floating vessel, thereby avoiding damaging the vessel, crew, or nearby structure.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

What is claimed is:

1. A marine vessel, comprising:
   a first shaft;
   a diesel engine configured to drive the first shaft;
   a gearbox connected to the shaft, and configured to be driven by the shaft;
   a second shaft connected to said gearbox, and to be driven by rotation of said first shaft;
   a main propeller in operative communication with said second shaft that causes said main propeller to rotate;
   an electrical generator in operative communication with said second shaft, and configured to generate electricity when said second shaft rotates;
   a plurality of electrically-driven thrusters electrically coupled to said electrical generator;
   at least one sensor configured to measure environmental forces on the marine vessel; and a processing unit in communication with said diesel engine and at least one sensor, and configured to:
operate in a stationary position mode to cause the marine vessel to maintain a stationary position while free-floating on a waterway;
determine a maximum force to be produced by any of said electrically-driven thrusters inclusive of respective propellers with angle adjustable propeller blades;
determine a minimum number of RPMs of said second shaft to enable the electricity-driven thrusters to produce the maximum force with a propeller blades of respective propellers at any angle; and
adjust RPMs of said diesel engine based on the determined minimum number of RPMs of said second shaft.

2. The marine vessel of claim 1, wherein said processing unit, in determining a minimum number of RPMs of said second shaft, includes execution of a simulation that determines adjustment of the blades of the propellers of the electrically-driven thrusters to produce the maximum force needed at different RPMs of said second shaft.

3. The marine vessel according to claim 2, wherein the simulator is configured to step a simulated diesel engine through a series of RPMs to cause a simulated electricity generator model to produce simulated electricity to drive simulated electrically-driven thrusters modeled from said electrically-driven thrusters to determine whether the maximum force is achievable by the electrically-driven thrusters of the marine vessel.

4. The marine vessel according to claim 3, wherein the simulated electrically-driven thrusters are limited to a maximum rotation rate less than a predetermined rate that is lower than 60%.

5. The marine vessel according to claim 4, wherein said simulated electricity-driven thrusters include propellers.

6. The marine vessel according to claim 2, wherein the simulation is configured to simulate driving a pair of simulated diesel engines that drive a pair of simulated electrical generators with different voltage levels and different frequencies.

7. The marine vessel according to claim 2, wherein said processing unit is configured to execute a simulation to:
(i) determine maximum power of said thrusters with blades of respective propellers at any angle to produce the maximum force,
(ii) determine RPMs of said diesel engine needed to drive said electrical generator to enable said thrusters to produce the maximum force; and
(iii) determine the maximum RPMs from a pre-established set of RPMs.

8. The marine vessel according to claim 7, wherein the pre-established set of RPM levels includes 60%, 70%, 80%, and 90% of 100% of possible RPM levels produced by said diesel engine when operated by the marine vessel.

9. The marine vessel according to claim 1, wherein said thrusters are positioned in a tunnel defined by a hollow portion of a hull of the marine vessel.

10. The marine vessel according to claim 1, wherein said processing unit is further configured to:
repeatedly execute the simulation to determine a maximum force to be produced by any of said electrically-driven thrusters;
select a minimum number of RPMs to operate the diesel engine from a selectable set of minimum number of RPMs;
cause said diesel engine to operate at the selected minimum number of RPMs; and
cause said electrically-driven thrusters to continuously be adjusted to maintain the marine vessel in the stationary position while the diesel engine is operating at the selected minimum number of RPMs.

11. The marine vessel according to claim 10, wherein said processing unit, in repeatedly executing the simulation, is further configured to determine whether angle of blades of said electrically-driven thrusters are capable of maintaining the stationary position of the marine vessel, and if not, rerunning the simulation, otherwise, not re-running the simulation.

12. The marine vessel according to claim 1, further comprising:
a third shaft connected to said diesel engine; and
a clutch connected between said third shaft and said first shaft.

13. A method of controlling a stationary position of a marine vessel, comprising:
executing, by a controller, an auto-stationary position mode to maintain a marine vessel in a free-floating, stationary position on a waterway;
executing a stationary position simulation to generate simulation results inclusive of power usage minimum needs by electrically-driven thrusters based on existing sensed environmental forces on the marine vessel; and
adjusting, by the controller, RPMs of a diesel engine as a function of the simulation results to satisfy the power usage minimum needs of the electrically-driven thrusters to maintain the marine vessel in the free-floating, stationary position on the waterway.

14. The method according to claim 13, wherein executing the stationary position simulation to generate simulation results inclusive of power usage minimum needs by the electrically-driven thrusters includes executing the stationary position simulation by setting angles of simulated electrically-driven thrusters to a maximum thrust angle.

15. The method according to claim 13, wherein executing the stationary position simulation includes stepping a simulated diesel engine through a series of RPMs to cause a simulated electricity generator model to produce simulated electricity to drive simulated electrically-driven thrusters to determine whether a maximum force to counteract the environmental forces is achievable by the electrically-driven thrusters of the marine vessel at each RPM setting.

16. The method according to claim 13, wherein executing the simulation includes executing the simulation by limiting a maximum rotation rate of the simulated electrically-driven thrusters to be less than a predetermined rate.

17. The method according to claim 13, wherein executing the simulation includes executing the simulation using simulated electrically-driven thrusters that include simulated propellers.

18. The method according to claim 13, wherein executing the simulation includes executing the simulation including:
(i) determining maximum power of the simulated electrically-driven thrusters with simulated blades of propellers at any angle to produce maximum force,
(ii) determining RPMs of the diesel engine needed to drive a generator to enable electrically-driven thrusters to produce the maximum force; and
(iii) determining the maximum RPMs from a pre-established set of RPMs.

19. The method according to claim 13, further comprising:

receiving measurement signals from sensors to determine environmental forces being applied to the marine vessel;

executing the simulation to determine, based on the received environmental forces, a maximum force to be produced by any of the electrically-driven thrusters to offset the environmental forces;

selecting a minimum number of RPMs for the diesel engine from a selectable set of minimum RPMs;

causing the diesel engine to operate at the selected minimum number of RPMs; and causing the electrically-driven thrusters to continuously be adjusted to maintain the marine vessel in the stationary position while the diesel engine is operating at the selected minimum number of RPMs.

20. The method according to claim 19, further comprising repeating the simulation between each command to control the number of RPMs of the diesel engine.

21. The method according to claim 20, wherein said processing unit, in repeatedly executing the simulation, is further configured to determine whether angle of blades of the electrically-driven thrusters are capable of maintaining the stationary position of the marine vessel, and if not, rerunning the simulation, otherwise, not re-running the simulation.

22. The method according to claim 20, further comprising measuring amount of electrical power being drawn by other electrically-driven devices on the marine vessel, and wherein executing the simulation includes including the amount of electrical power being drawn by the other electrically-driven devices in generating the simulation results.

* * * * *